United States Patent

Fathauer

[15] 3,670,318
[45] June 13, 1972

[54] LOAD CELL OUTPUT CIRCUIT

[72] Inventor: George H. Fathauer, Decatur, Ill.

[73] Assignee: Eaton Yale & Towne Inc., Morton Grove, Ill.

[22] Filed: July 7, 1969

[21] Appl. No.: 839,289

[52] U.S. Cl..............................340/199, 177/210
[51] Int. Cl.......................................G08c 19/00
[58] Field of Search..............340/199, 244; 329/50; 177/210

[56] References Cited

UNITED STATES PATENTS

| | | | |
|---|---|---|---|
| 2,718,546 | 9/1955 | Schlesinger | 329/50 |
| 3,184,689 | 5/1965 | Wylde | 340/213 |
| 3,333,258 | 7/1967 | Walker | 340/244 |
| 2,885,660 | 5/1959 | Hecox et al. | 340/199 |
| 3,046,533 | 7/1962 | Torn et al. | 340/199 |
| 3,046,535 | 7/1962 | Philbin et al. | 340/199 |
| 3,204,229 | 8/1965 | Dulberger | 340/196 |
| 3,263,496 | 8/1966 | Fathauer | 177/211 |
| 3,456,132 | 7/1969 | Dechelotte | 340/199 |
| 3,494,196 | 2/1970 | Moussette | 340/228 |

Primary Examiner—John W. Caldwell
Assistant Examiner—Robert J. Mooney
Attorney—Hill, Sherman, Meroni, Gross & Simpson

[57] ABSTRACT

A load weighing system including an oscillator for supplying a signal to a load cell and at the same time supplying a like signal to a phase detector circuit. The output of the load cell is coupled through an amplifier to the input of the phase detector circuit, and changes in loading on the cell produce a linearly increasing signal at the output of the phase detector circuit for triggering a meter device or the like. Spurious signals including signals of the operating frequency or of incorrect phase are nullified in the phase detector circuit and accordingly do not trigger the metering circuit. The metering circuit may include a pair of transistors connected in parallel so that both of the transistors conduct equally when a null condition is received at the output of the load cell. This equal conduction is then measured by means of lamps or the like which may be connected in series with each of the transistors.

5 Claims, 1 Drawing Figure

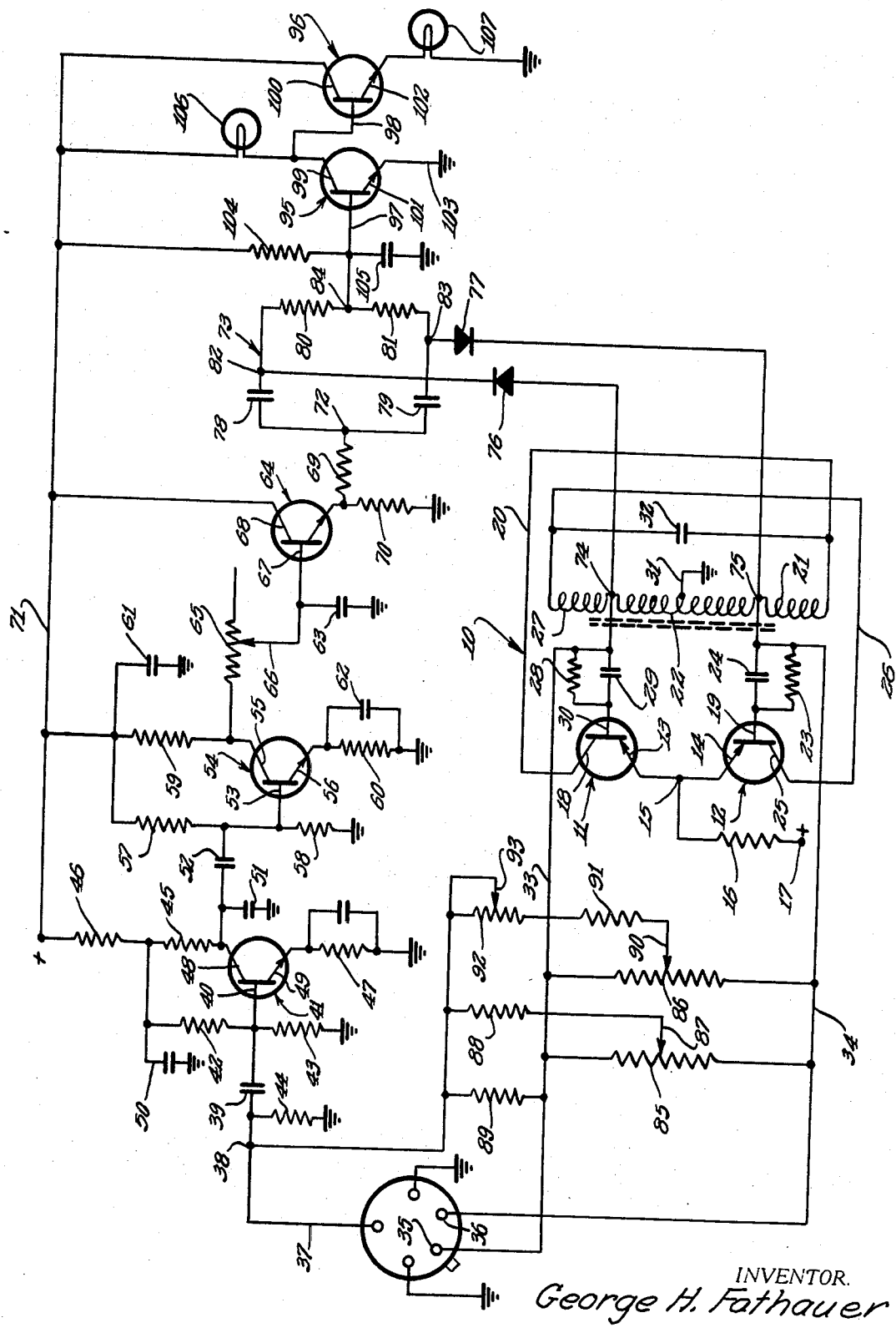

3,670,318

LOAD CELL OUTPUT CIRCUIT

BACKGROUND OF THE INVENTION

1. Field of the Invention

The field of art to which this invention pertains is load weighing systems and in particular to electronic circuitry for isolating the output signal from a load cell and for providing metering means for registering a null condition at the output of The cell.

2. Summary of the Invention

It is an important feature of the present invention to provide an improved electrical circuit for use in measuring the output of a load cell.

It is another feature of the present invention to provide circuit means for responding to the output signal of a load cell, while eliminating undesired response to extraneous or unwanted signals.

It is a principal object of the present invention to provide circuit means for accurately and quickly reading the output from a load cell.

It is also an object of the present invention to provide inexpensive and effective circuit means for eliminating out-of-phase signal components from interfering with the load cell output reading.

It is a further object of the present invention to provide a phase detector which compares the output of an oscillator which supplies the load cell with the output of the load cell and which provides a linear response signal so long as the desired phase relationship between the compared signals exist.

It is an additional object of the present invention to provide the combination of a substantially high frequency oscillator together with a load cell and an output amplifier for feeding a phase detector and wherein a meter means is coupled to the output of the phase detector to determine a null condition.

It is also an object of the present invention to provide means for adjusting the input current to a load cell to be substantially zero after a load has been applied thereto and wherein the adjustment of the output signal to zero simultaneously registers the loading on the load cell.

These and other objects, features and advantages of the invention will be readily apparent from the following description of a preferred embodiment thereof, taken in conjunction with the accompanying drawing, although variations and modifications may be effected without departing from the spirit and scope of the novel concepts of the disclosure.

BRIEF DESCRIPTION OF THE DRAWING

The single figure shows a circuit including an oscillator for feeding a load cell, an amplifier, and a phase detector which is also coupled to the oscillator as well as an output null condition indicator for registering a null point when the weight adjustment potentiometer is adjusted to produce zero signal at the output of the load cell.

DESCRIPTION OF THE PREFERRED EMBODIMENT

The circuit of the present invention provides an oscillator for developing a signal at, for instance, 2,500 cycles per second which signal is then coupled to a load cell such as is disclosed in U.S. Pat. No. 3,263,496. The load cell then provides an output in response to the load received thereon, and this output is coupled through an amplifier to a phase detector.

The phase detector is also coupled to the oscillator and compares the phase of the oscillator with the phase received at the phase detector from the amplifier to determine whether a response signal will be generated to trigger a metering circuit. In this way, spurious signals are not passed by the phase detector, and in-phase signals are used to generate an output signal to indicate the presence or absence of a null condition at the output of the load cell.

The present circuit operates on the principle that a meter or indicator is used to designate the presence of a null condition at the output of the load cell. Accordingly, when a load is placed on the cell, means are provided to null out the resulting signal such as by a potentiometer or the like. Accordingly by calibrating the potentiometer, the amount of null signal required can be related to pounds or other units of weight.

Referring to the circuit in detail, an oscillator 10 has a pair of transistors 11 and 12 having emitters 13 and 14 respectively. The emitters are coupled together at a point 15 which in turn is coupled through a resistor 16 to a circuit point 17. The circuit point 17 is supplied with a positive voltage signal such as, for instance, +12 volts. This then is the supply for the oscillator.

As is well understood, the collector 18 of the transistor 11 is coupled to the base 19 of the transistor 12 through a lead 20, a portion 21 of a coil 22, and through an RC circuit consisting of a resistor 23 and a capacitor 24.

Similarly, the collector 25 of the transistor 12 is coupled through a lead 26 and a portion 27 of the coil 22 and through an RC network including a resistor 28 and a capacitor 29 to the base 30 of the transistor 11.

The coil 22 connects the two base circuits of the respective transistors together and is provided with a center ground point 31 as shown. A capacitor 32 is coupled across the coil 22.

The output of the oscillator 10 is coupled from the respective base circuits of the transistors through lines 33 and 34 to circuit points 35 and 36. These circuit points are the input to the load cell such as is shown in U.S. Pat. No. 3,263,496. The output of that load cell is coupled to a circuit line 37. The output takes the form of a varying current and a point 38 may be referred to as a circuit current summing point.

The current summing point 38 is coupled through a capacitor 39 to a base 40 of a transistor 41. The transistor 41 has associated with it a series of resistors 42, 43, 44, 45, 46 and 47. All of these resistors determine the operating point for the transistor 41. The resistors 45, 46 and 47 determine the bias for the collector 48 and the emitter 49 respectively. Capacitors are provided to ground such as the capacitors 50 and 51.

A coupling capacitor 52 couples the collector 48 to an emitter 53 of a further transistor 54. The transistor 54 has a collector 55 and an emitter 56 and also has a series of resistors 57, 58, 59 and 60 associated therewith as in the case of the transistor 41. Likewise, capacitors 61, 62 and 63 are provided to ground as shown.

A further transistor 64 is resistively coupled to the collector 55 of the transistor 54 through a resistor 65. A movable contact 66 connects the output of the transistor 54 to the input or base 67 of the transistor 64. The transistor 64 has a collector 68 and a pair of resistors 69 and 70 associated therewith.

Each of the transistors 41, 54 and 64 have their voltage supply from a main circuit line 71 which is maintained at a positive voltage level, such as, for instance, +12 volts.

All of the transistors 41, 54 and 64 together provide an amplifier for the current signal which may appear at the current summing point 38. The resistor 69 couples the amplified current signal to the input 72 of the phase detector network 73.

The oscillator 10 also has its output signal as taken from circuit points 74 and 75 coupled through a pair of diodes 76 and 77 to the phase detector circuit 73. The phase detector circuit includes a pair of capacitors 78 and 79 and a pair of series connected resistors 80 and 81. When the output from the transistor 64 is in phase with the signal appearing at terminals 82 and 83 as developed from the oscillator 10, a signal appears at the phase detector output 84.

Referring to the current summing point 38, a current signal appears at that point in response to an increasing load on the load cell. Since the output condition of this circuit which is being sensed is a null condition, means must be provided to subtract current from the current summing point to produce that null condition. Such a means is provided in the form of a balance resistor 85 and a weight adjustment resistor 86. The balance resistor is coupled from the base of the transistor 12 through a movable contact 87 and a resistor 88 directly to the current summing point. A resistor 89 is connected from the current summing point to the base of the transistor 11.

The weight adjustment resistor is connected from the base of the transistor 12 through a movable contact 90 and a pair of resistors 91 and 92 directly to the current summing point. The resistor 92 also has a movable contact 93.

The resistor 85 can be of such a magnitude that adjustment of the movable contact 87 will result in a balanced condition when there is substantially no weight on the cell.

The resistor 86 may be calibrated so that movement of the pointer 90 effectively registers the weight which is present on the load cell. This is accomplished by indirectly measuring the current adjustment which must take place at the current summing point 38 in order to accomplish the null condition which is required at the output of the circuit.

This null condition is sensed by a circuit utilizing a pair of transistors 95 and 96. The transistors 95 and 96 have base circuits 97 and 98, collector circuits 99 an 100 and emitter circuits 101 and 102 respectively.

The emitter 101 of the transistor 95 is connected to ground at circuit point 103 and the collector 99 of the transistor 95 is connected directly to the base 98 of the transistor 96. A resistor 104 and a capacitor 105 provide the bias level for the input to the transistor 95.

A pair of lamps 106 and 107 are respectively connected in series with the transistors 95 and 96, and these lamps are turned on when their respective transistors are turned on.

When a large signal appears at the output of the phase detector as at 84, the transistor 95 is turned on, thereby lowering the voltage at the collector 99 and hence at the base 98 of the transistor 96. This turns the transistor 96 off and likewise the lamp 107 is off. However the lamp 106 is at full brilliance.

The circuit parameters may be arranged such that when a null condition is achieved at the point 84, both of the transistors are on equally and hence both of the lamps are of equal brilliance.

Accordingly the movable contact 90 may be adjusted until the current at the circuit point 38 is zero and hence a null condition will be achieved at the circuit point 84 and both lamps will be at equal brilliance. Since the contact 90 is calibrated according to weight, then a direct reading is provided of the weight of the load which is being sustained by the load cell.

I claim as my invention:

1. A load weighing system comprising:
a load cell for weighing a load and producing an A.C. output which varies in amplitude and phase;
an oscillator supplying an A.C. input to said load cell;
a current summing point at the output of said load cell;
a weight adjustment resistor connected across the output of said oscillator;
a movable contact engageable with said weight adjustment resistor and connected to said current summing point;
an amplifier with its input connected to said current summing point;
a phase detector circuit connected to the output of said amplifier;
a first diode connected to pass positive signals from said oscillator to said phase detector;
a second diode connected to pass negative signals from said oscillator to said phase detector;
a transistor switch with its base electrode connected to said phase detector; and
indicating means connected in circuit with said transistor to indicate when the current at said current summing point goes to zero resulting from movement of said movable contact relative to said weight adjustment resistor such that the position of said movable contact indicates the weight of said load on said load cell.

2. A load weighing system according to claim 1 wherein said indicating means comprises a signal lamp connected in the emitter-collector circuit of said transistor and said transistor conducts and turns said signal lamp on when the current at said current summing point is not zero.

3. A load weighing system according to claim 2 wherein said phase detector circuit includes a parallel circuit having two branches between said amplifier and the base of said transistor with each of said branches including series connected capacitors and resistors, and wherein said first and second diodes are respectively connected to the junction points between said series connected capacitors and resistors.

4. A load weighing circuit according to claim 3 comprising a balance resistor connected across the output of said oscillator and having a movable contact connected to said current summing point and adjustable to adjust the zero load point of said load weighing system.

5. A load weighing circuit according to claim 4 comprising a second transistor with its base coupled to said first transistor so that it conducts when the first transistor is turned off, and a second signal lamp connected in the emitter-collector circuit of said second transistor.

* * * * *